United States Patent
Noma et al.

(10) Patent No.: US 9,424,969 B2
(45) Date of Patent: Aug. 23, 2016

(54) MAGNETO-RHEOLOGICAL FLUID AND CLUTCH USING THE SAME

(71) Applicant: Kurimoto, Ltd., Osaka (JP)

(72) Inventors: Junichi Noma, Osaka (JP); Masami Nakano, Miyagi (JP)

(73) Assignee: Kurimoto, Ltd., Osaka (JP)

( * ) Notice: Subject to any disclaimer, the term of this patent is extended or adjusted under 35 U.S.C. 154(b) by 155 days.

(21) Appl. No.: 14/509,180

(22) Filed: Oct. 8, 2014

(65) Prior Publication Data

US 2015/0270044 A1   Sep. 24, 2015

(30) Foreign Application Priority Data

Mar. 20, 2014 (JP) ................................ 2014-057781

(51) Int. Cl.
- *F16D 27/00* (2006.01)
- *H01F 1/44* (2006.01)
- *F16D 37/02* (2006.01)
- *F16D 37/00* (2006.01)

(52) U.S. Cl.
CPC ................ *H01F 1/447* (2013.01); *F16D 37/02* (2013.01); *F16D 2037/007* (2013.01)

(58) Field of Classification Search
CPC .... H01F 1/447; F16D 37/02; F16D 2037/007
See application file for complete search history.

(56) References Cited

U.S. PATENT DOCUMENTS

| | | | |
|---|---|---|---|
| 4,882,224 A * | 11/1989 | Moro | B22F 1/02 427/127 |
| 5,525,249 A | 6/1996 | Kordonsky et al. | |
| 5,540,053 A | 7/1996 | Graichen | |
| 5,549,837 A | 8/1996 | Ginder et al. | |
| 5,900,184 A | 5/1999 | Weiss et al. | |
| 6,318,531 B1 * | 11/2001 | Usoro | F16D 37/008 192/21.5 |
| 6,619,453 B2 * | 9/2003 | Stretch | F16D 27/112 192/21.5 |
| 7,354,528 B2 * | 4/2008 | Cheng | H01F 1/447 252/62.52 |
| 2002/0166745 A1 | 11/2002 | Szalony | |
| 2002/0171067 A1 * | 11/2002 | Jolly | C10M 171/001 252/570 |

(Continued)

FOREIGN PATENT DOCUMENTS

| | | | |
|---|---|---|---|
| JP | 56-118496 A | 9/1981 | |
| JP | 07-505978 A | 6/1995 | |

(Continued)

OTHER PUBLICATIONS

International Searching Authority, International Search Report (ISR) and Written Opinion for International Application No. PCT/JP2012/001408, mailed Jun. 5, 2012, 9 pages, Japan Patent Office, Japan.

(Continued)

*Primary Examiner* — David J Hlavka
(74) *Attorney, Agent, or Firm* — Alston & Bird LLP

(57) ABSTRACT

A magneto-rheological fluid includes a magnetic particle mixture, and a dispersion medium for dispersing the magnetic particle mixture. The magnetic particle mixture contains the first magnetic particles and the second magnetic particles. The first magnetic particles have an average particle diameter of 1 μm or more and 30 μm or less. The second magnetic particles are particles of a soft magnetic material, and have an average particle diameter of 50 nm or more and 200 nm or less. A ratio of the second magnetic particles in the magnetic particle mixture is 10% by mass or more and 40% by mass or less.

7 Claims, 5 Drawing Sheets

(56) References Cited

U.S. PATENT DOCUMENTS

| | | |
|---|---|---|
| 2013/0341145 A1 | 12/2013 | Ueshima et al. |
| 2014/0299434 A1* | 10/2014 | Lull ........................ F16D 37/02 192/21.5 |
| 2014/0339029 A1* | 11/2014 | Ido .......................... F16F 9/535 188/267.2 |

FOREIGN PATENT DOCUMENTS

| | | |
|---|---|---|
| JP | H07-507978 A | 9/1995 |
| JP | 11-513192 A | 11/1999 |
| JP | 2001-267117 A | 9/2001 |
| JP | 2004-076749 A | 3/2004 |
| JP | 2005-206624 A | 8/2005 |
| JP | 2006-274300 A | 10/2006 |
| JP | 2009-117797 A | 5/2009 |
| JP | 2010-101409 A | 5/2010 |
| JP | 2010-212580 A | 9/2010 |
| JP | 2013-181598 A | 9/2013 |
| WO | WO 93/21644 A1 | 10/1993 |
| WO | WO 97/15058 A1 | 4/1997 |
| WO | WO 2012/120842 A1 | 9/2012 |

OTHER PUBLICATIONS

Viota, J. L. et al., *Study of the Magnetorheology of Aqueous Suspensions of Extremely Biomodal Magnetite Particles*, The European Physical Journal E 29 (2009) 87-94.

* cited by examiner

MAGNETO-RHEOLOGICAL FLUID AND CLUTCH USING THE SAME

CROSS-REFERENCE TO RELATED APPLICATION

This application claims priority to Japanese Patent Application No. 2014-057781 filed on Mar. 20, 2014, the entire disclosure of which is incorporated by reference herein.

BACKGROUND

The present disclosure relates to a magneto-rheological fluid and a clutch using the same.

A magneto-rheological (MR) fluid is obtained by dispersing magnetic particles such as iron (Fe) particles, etc. in a dispersion medium such as oil, etc. The magnetic particles in the MR fluid suspend at random in the dispersion medium in the absence of a magnetic field. When the magnetic field is applied to the MR fluid, the magnetic particles form multiple clusters along a direction of the magnetic field, and yield stress of the MR fluid increases. Thus, rheological or mechanical properties of the MR fluid can easily be controlled by an electrical signal, and application of the MR fluid to various technical fields has been considered. At present, the MR fluid has been used in direct-acting devices such as shock absorbers for automobiles, seat dampers for construction machines, etc.

A magnetic fluid is another example of the fluid containing the magnetic particles dispersed in the dispersion medium such as oil, etc. The magnetic particles dispersed in the magnetic fluid have a diameter of about several nm to 10 nm, and the particles oscillate by Brownian motion caused by thermal energy. Thus, the magnetic fluid is completely different from the MR fluid in that the magnetic particles do not form the clusters even when the magnetic field is applied, and the yield stress does not increase.

The magnetic particles generally used in the MR fluid have an average particle diameter of several μm to several tens of μm. The magnetic particles in the MR fluid are larger than those in the magnetic fluid, and can form the clusters when the magnetic field is applied. However, the large magnetic particles in the MR fluid may precipitate when left standing, and may cause caking of the MR fluid. When the magnetic field is applied and released repeatedly, the magnetic particles are agglomerated, and a stable dispersion state cannot be maintained. For improved stability of the MR fluid, an MR fluid containing two types of the magnetic particles of different particle diameters has been studied (see, e.g., Japanese Translation of PCT International Application No. H07-507978 and International Patent Publication No. WO2012/120842).

For example, according to Japanese Translation of PCT International Application No. H07-507978, large diameter carbonyl iron particles and small diameter chromium dioxide particles are mixed. The chromium dioxide particles are adsorbed by the carbonyl iron particles to stabilize the MR fluid.

According to International Patent Publication No. WO2012/120842, large diameter carbonyl iron particles are mixed with a small amount of small diameter iron particles. This can stabilize the MR fluid, and can reduce shear stress under high shear rate conditions.

SUMMARY

The patent documents described above merely consider the stability of the MR fluid. In the MR fluid, the increase in stress when the magnetic field is applied is preferably as great as possible, and the magnetic field applied to the MR fluid is preferably as low as possible. However, performance of the MR fluid containing two types of the magnetic particles having different particle diameters upon application of the magnetic field has hardly been studied.

The present disclosure provides a high-efficiency MR fluid which sensitively increases stress upon application of the magnetic field.

A magneto-rheological fluid in an aspect the present disclosure includes: a magnetic particle mixture; and a dispersion medium for dispersing the magnetic particle mixture. The magnetic particle mixture contains first magnetic particles and second magnetic particles. The first magnetic particles have an average particle diameter of 1 μm or more and 30 μm or less. The second magnetic particles are particles of a soft magnetic material, and have an average particle diameter of 50 nm or more and 200 nm or less. A ratio of the second magnetic particles in the magnetic particle mixture is 10% by mass or more and 40% by mass or less.

In the magneto-rheological fluid in the aspect of the present disclosure, the second magnetic particles may be magnetite particles, or iron particles formed by an arc plasma method.

In the magneto-rheological fluid in the aspect of the present disclosure, the average particle diameter of the first magnetic particles may be 20 times or more the average particle diameter of the second magnetic particles, and may be 500 times or less the average particle diameter of the second magnetic particles.

In the embodiment of the magneto-rheological fluid, the first magnetic particles may be carbonyl iron powder.

In the magneto-rheological fluid in the aspect of the present disclosure, a surface modification layer may be formed on a surface of each of the second magnetic particles.

In this case, the surface modification layer may be made of a compound having a hydrocarbon chain bonded the surface of each of the second magnetic particles.

A clutch in an aspect of the present disclosure includes: a first member and a second member which are relatively rotatable; a magneto-rheological fluid filling a space between the first member and the second member; and a magnetic field generator for applying a magnetic field to the magneto-rheological fluid. The magneto-rheological fluid is the disclosed magneto-rheological fluid.

The present disclosure can provide a high-efficiency magneto-rheological fluid which sensitively increases stress upon application of the magnetic field.

DETAILED DESCRIPTION

A magneto-rheological (MR) fluid of an embodiment includes a magnetic particle mixture containing first magnetic particles and second magnetic particles, and a dispersion medium for dispersing the magnetic particle mixture. The first magnetic particles may be magnetic particles which are generally used in the MR fluid, and have an average particle diameter of about 1 μm-30 μm. The second magnetic particles may be particles of a soft magnetic material, and may have an average particle diameter of about 50 nm-200 nm. A ratio of the second magnetic particles to the magnetic particle mixture (a mixing ratio of the second magnetic particles) may be about 10% by mass-40% by mass.

The first magnetic particles may be made of any material as long as they have an average particle diameter in the suitable range. For example, the first magnetic particles may be made of iron, iron nitride, iron carbide, carbonyl iron, chromium dioxide, low-carbon steel, nickel, cobalt, etc. An iron alloy such as an aluminum-containing iron alloy, a silicon-containing iron alloy, a cobalt-containing iron alloy, a nickel-containing iron alloy, a vanadium-containing iron alloy, a molybdenum-containing iron alloy, a chromium-containing iron alloy, a tungsten-containing iron alloy, a manganese-containing iron alloy, a copper-containing iron alloy, etc. may also be used. Further, the first magnetic particles may be particles of a paramagnetic, superparamagnetic, or ferromagnetic compound made of gadolinium or an organic derivative of gadolinium, or a mixture of these compounds. Among them, carbonyl iron is preferable because the first magnetic particles of the suitable average particle diameter can easily be obtained.

The first magnetic particles have an average particle diameter in a range from 1 μm or more, preferably 3 μm or more, more preferably 5 μm or more to 30 μm or less, more preferably 15 μm or less.

The second magnetic particles have an average particle diameter smaller than the average particle diameter of the first magnetic particles. By mixing a suitable amount of the second magnetic particles having the average particle diameter smaller than that of the first magnetic particles, increase in normal viscosity when the magnetic field is not applied can be reduced, and the viscosity can greatly be increased when the magnetic field is applied. Stability of the MR fluid can be improved by mixing the second magnetic particles.

Figure 1A:
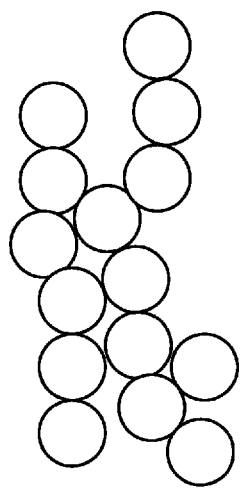
FIGS. 1A-1C illustrate cluster structures formed in a magneto-rheological fluid.
Figure 1B:
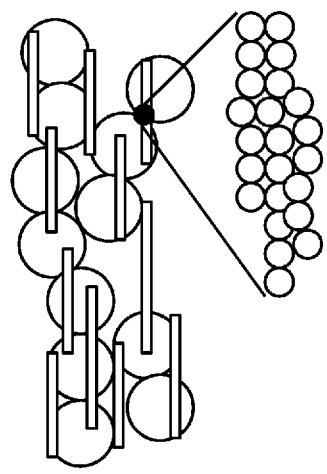
Figure 1C:
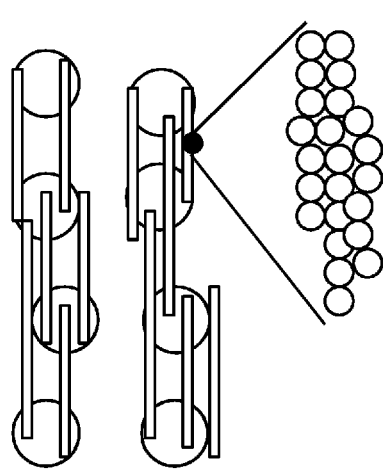

The first magnetic particles and the second magnetic particles form structures as shown in FIGS. 1A-1C depending on their mixing ratios. When the small diameter second magnetic particles are not contained in the MR fluid, the first magnetic particles form a chain structure as shown in FIG. 1A when the magnetic field is applied. When a suitable amount of the second magnetic particles is contained, the chain structure formed by the first magnetic particles is reinforced by the second magnetic particles as shown in FIG. 1B. When the mixing ratio of the second magnetic particles is increased to reduce the mixing ratio of the first magnetic particles, gaps between the first magnetic particles are increased as shown in FIG. 1C.

The chain-shaped clusters of the first magnetic particles reinforced by the second magnetic particles as shown in FIG. 1B can increase yield stress and shear stress under high shear rate conditions. The viscosity of the fluid increases when a large amount of the second magnetic particles is added. However, when the amount of the second magnetic particles is small, the normal viscosity in the absence of the magnetic field does not greatly increase as compared with the viscosity of the fluid containing the first magnetic particles only.

In the structure shown in FIG. 1C, the reinforcement effect by the second magnetic particles is obtained to a certain degree, and the increase in yield stress and shear stress under high shear rate conditions can be expected. However, the second magnetic particles exhibit structural viscosity, and the normal viscosity greatly increases as compared with the viscosity of the fluid containing the first magnetic particles only.

To obtain the sufficient reinforcement effect by the second magnetic particles, the mixing ratio of the second magnetic particles is in a range from 10% by mass or more, preferably 15% by mass or more, more preferably 20% by mass or more to 40% by mass or less, preferably 35% by mass or less, more preferably 30% by mass or less. Particularly preferable mixing ratio of the second magnetic particles is 25% by mass. This range is preferable in view of reduction of increase of the normal viscosity.

The second magnetic particles may be any particles as long as they are smaller in diameter than the first magnetic particles, and can enter the gaps between the first magnetic particle clusters to form clusters reinforcing the first magnetic particle clusters when the magnetic field is applied. For forming the clusters upon application of the magnetic field, and contributing to the function of the MR fluid, the average particle diameter of the second magnetic particles is in a range from 50 nm or more, preferably 60 nm or more, more preferably 70 nm or more to 200 nm or less, preferably 150 nm or less. Thus, the average particle diameter of the second magnetic particles may be about 50 nm-200 nm, preferably about 50 nm-150 nm. Mixing the second magnetic particles having the average particle diameter in the above-described range can reduce precipitation of the MR fluid, and can improve stability of the MR fluid.

To obtain the reinforcement effect of the second magnetic particles, the ratio of the diameter of the first magnetic particles to the diameter of the second magnetic particles is preferably large. Specifically, the average particle diameter of the first magnetic particles is preferably 20 times or more, more preferably 30 times or more, much more preferably 50 times or more the average particle diameter of the second magnetic particles. Further, the average particle diameter of the first magnetic particles is preferably 500 times or less, more preferably 300 times or less, much more preferably 100 times or less the average particle diameter of the second magnetic particles.

The second magnetic particles are preferably particles of a soft magnetic material. The particles of the soft magnetic material have a coercive force of about 100 Oe-200 Oe, and do not become magnetized when the magnetic field is not applied. For example, iron particles formed by an arc plasma method are preferable because the iron particles having the suitable average particle diameter as the second magnetic particles are easily obtained. Further, particles of magnetite, a composite oxide containing divalent iron and trivalent iron, are also preferable because the magnetite particles having the suitable average particle diameter as the second magnetic particles are easily obtained.

The dispersion medium may be any material as long as it is liquid which can disperse the magnetic particle mixture. For example, the dispersion medium may be silicon oil, fluorine oil, polyalphaolefin, paraffin, ether oil, ester oil, mineral oil, vegetable oil, animal oil, etc. The dispersion medium may be an organic solvent such as toluene, xylene, hexane, etc., or ionic liquid (room temperature molten salt) such as ethyl methyl imidazolium salt, 1-butyl-3-methyl imidazolium salt, 1-methylpirazorium salt, etc. They may be used solely, or two or more of them may be used in combination.

For exhibiting the function of the MR fluid, a concentration of the magnetic particle mixture in the dispersion medium is preferably 5 vol % or higher, more preferably 10 vol % or higher. To reduce the increase in normal viscosity, the concentration is preferably 50 vol % or lower, more preferably 30 vol % or lower.

Preferably, the first magnetic particles, the second magnetic particles, and the dispersion medium are mixed first with a spatula etc., and then sufficiently mixed at a high shear rate using a rotation/revolution stirrer, etc. The first magnetic particles may be dispersed first in the dispersion medium, and then the second magnetic particles may be dispersed in the dispersion medium. Alternatively, the second magnetic particles may be dispersed first in the dispersion medium, and then the first magnetic particles may be dispersed in the dispersion medium. In place of the stirrer, a homogenizer, a planetary mixer, etc. may be used to disperse the magnetic particles. The magnetic particles may be dispersed by adding a dispersion agent, etc.

A surface modification layer may be provided on surfaces of the second magnetic particles to keep the normal viscosity of the MR liquid low, and to improve stability of the MR liquid. Providing the surface modification layer increases hydrophobicity (lipophilicity) of the surfaces of the particles, keeps the normal viscosity low, and allows easy dispersion of the particles into the dispersion medium.

For example, the surface modification layer may be made of a silane coupling agent. The silane coupling agent used to form the surface modification layer may be any silane coupling agent as long as it has a hydrolyzable group such as a methoxy group, an ethoxy group, etc. reacting with a hydroxyl group formed on the surfaces of the metal particles. Other coupling agents may also be used in place of the silane coupling agent as long as the coupling agent can react with a hydroxyl group. To turn the surfaces of the second magnetic particles hydrophilic by forming the surface modification layer, a coupling agent having only a hydrocarbon chain, such as methyltriethoxysilane, methyltrimethoxysilane, etc., is preferably used. After bonding the silane coupling agent having a reactive functional group, a hydrophobic compound may be fixed with the reactive functional group. A functional group having high affinity for the dispersion medium may be introduced in accordance with the type of the dispersion medium used. A coupling reaction is preferably carried out in a vapor phase than in a liquid phase because coagulation of the second magnetic particles can be reduced. The surface modification layer is preferably formed uniformly on each of the surfaces of the second magnetic particles, but may be formed at least partially on each of the surfaces of the second magnetic particles. For easy dispersion, the surface modification layer may be formed not only on the second magnetic particles, but also on the first magnetic particles. When a hydrophilic surface modification layer is used, water, etc. may be used as the dispersion medium.

In forming the surface modification layer, the magnetic particles are preferably deagglomerated. The deagglomeration may be performed by a known method using a mill (e.g., a ball mill). The average particle diameter of the second magnetic particles can precisely be controlled to a predetermined size or smaller by the deagglomeration. The deagglomeration of the second magnetic particles may be omitted.

Figure 2:
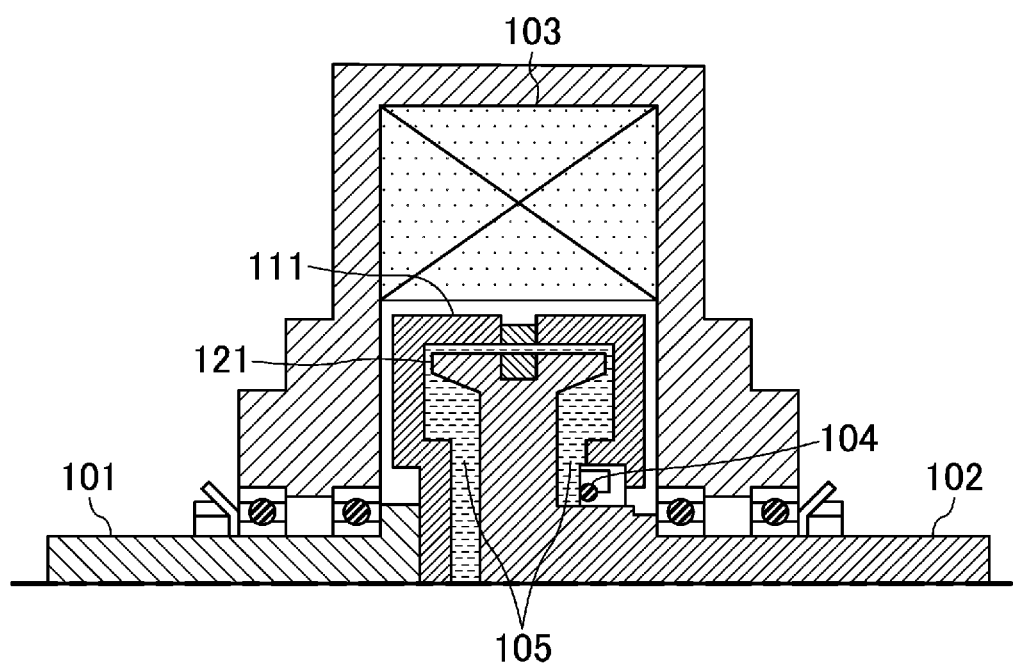
FIG. 2 is a cross-sectional view illustrating an example of a clutch.

For example, the MR fluid of the present embodiment may be applied to a clutch shown in FIG. 2. The clutch includes an input shaft 101, an output shaft 102, and an electromagnet 103 as a magnetic field generator arranged to surround the shafts. An external cylinder 111 is fixed to an end of the input shaft 101, and a rotor 121 is fixed to an end of the output shaft 102. The external cylinder 111 surrounds the rotor 121, and the external cylinder 111 and the rotor 121 are arranged to be relatively rotatable. An oil seal 104 is provided to hermetically seal space inside the external cylinder 111. A gap is formed between the external cylinder 111 and the rotor 121, and an MR fluid 105 fills the gap under a centrifugal force when the external cylinder 111 rotates. When the magnetic field is generated by the electromagnet 103, the magnetic particles in the MR fluid form clusters along a direction of a magnetic lux, and torque is transmitted through the clusters between the external cylinder 111 and the rotor 121.

In addition to the clutch, the MR fluid can also be applied to a torque control device such as a brake, etc. In particular, the MR fluid can be applied to devices used under high shear rate conditions.

Properties of the MR fluid will be described in more detail by way of examples.

[First Magnetic Particles]

Carbonyl iron powder CS (manufactured by BASF) having an average particle diameter of 6.6 μm was used as the first magnetic particles.

[Second Magnetic Particles]

Fe nanoparticles having an average particle diameter of 0.1 μm were used as the second magnetic particles. The Fe nanoparticles were formed by an arc plasma method described below. The average particle diameter was obtained by a Brunauer-Emmett-Teller (BET) method.

Figure 3:
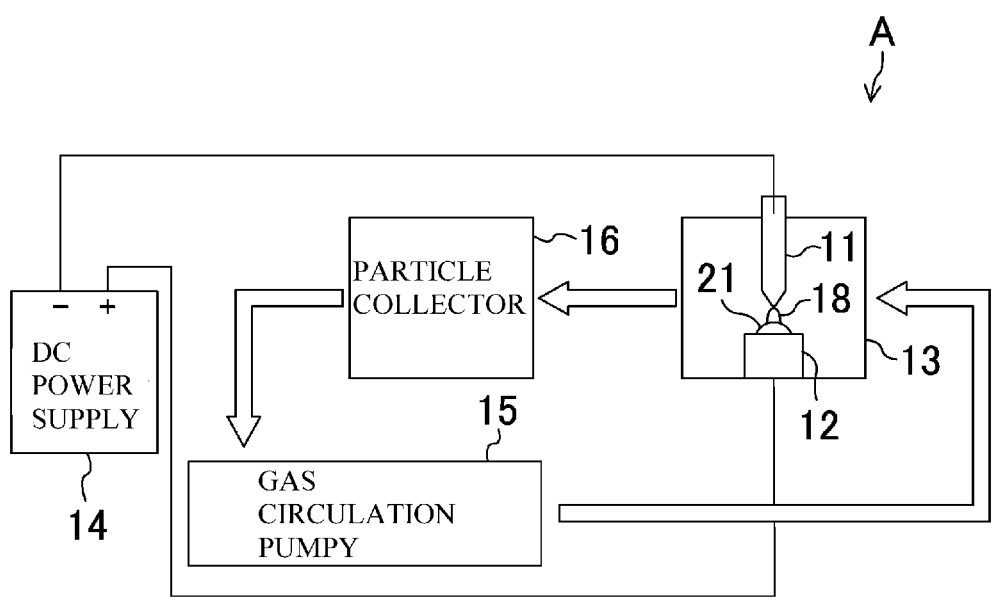
FIG. 3 is a block diagram illustrating an example of a device for manufacturing second magnetic particles.

A container 13 of a device A shown in FIG. 3 was filled with a gaseous mixture of hydrogen and argon at atmospheric pressure. Partial pressures of hydrogen and argon were 0.5 atm. A current of 150 A at 40V was supplied between a plasma torch 11 (a negative electrode) made of tungsten and a metal material 21 (a positive electrode) placed on a water-cooled copper hearth 12 by a DC power supply 14 to generate arc plasma 18. Pure iron (99.98% pure, manufactured by Aldrich) was used as the metal material 21. Iron particles were generated at a rate of about 0.8 g/min.

After the iron particles were generated, atmosphere in the container 13 and a particle collector 16 was controlled to dry air containing 5% of argon (nitrogen: 80%, oxygen: 20%), and the particles were left stand for 3 hours. Thus, an oxide film of about 2 nm-10 nm in thickness was formed on the surfaces of the iron particles. The formation of the oxide film was observed by a transmission electron microscope (TEM). The thickness of the oxide film did not greatly vary even after the particles were left stand for more than 3 hours.

The iron particles with the oxide film formed thereon were removed from the device A, and left stand at room temperature for an hour in atmospheric air to introduce a hydroxyl group to the surfaces of the iron particles. Then, the iron particles having the hydroxyl group and a silane coupling agent were placed in a pressure container, and the pressure container was hermetically sealed. Methyltrimethoxysilane (KBM-13 manufactured by Shin-Etsu Chemical Co., Ltd.) was used as the silane coupling agent. The silane coupling agent was placed in a container having an opening, such as a beaker etc., so that the iron particles were not directly mixed with the silane coupling agent. The silane coupling agent was added in a ratio of 0.38 g relative to 10 g of the iron particles. The pressure container containing the iron particles and the silane coupling agent was placed in a drying furnace at 80° C. for 2 hours to vaporize the silane coupling agent in the pressure container. The vaporized silane coupling agent reacted with the hydroxyl group on the surfaces of the iron particles to provide the second magnetic particles having the surface modification layer formed on their surfaces.

After the surface modification layer was formed, the second magnetic particles were dispersed in toluene, and deagglomerated for 6 hours by a ball mill. A 1-liter zirconia pod was used as a pod of the ball mill, and a zirconia ball of 1 mm in diameter was used as a ball of the ball mill.

The obtained second magnetic particles had a coercive force of 175 Oe. The coercive force was measured by a vibrating sample magnetometer (VSM).

[Preparation of MR Fluid]

The first magnetic particles and the second magnetic particles were dispersed in a dispersion medium in the predetermined ratio to obtain an MR fluid. Silicon oil (KF-96-50cs manufactured by Shin-Etsu Chemical Co., Ltd.) was used as the dispersion medium. A predetermined amount of the first magnetic particles, a predetermined amount of the second magnetic particles, and a predetermined amount of the dispersion medium were manually mixed in a container using a spatula, and then mixed at a high shear rate using a rotation/revolution stirrer (Mazerustar manufactured by Kurabo Industries Ltd.) to disperse the magnetic particles in the dispersion medium. A magnetic particle mixture containing the first magnetic particles and the second magnetic particles had a concentration of 10 vol % in the dispersion medium.

[Evaluation]

The shear stress was measured by a high precision rheometer (RheoStress 6000 manufactured by HAAKE) including a magnetic field application device (MR-101N manufactured by EKO Instruments). A gap between flat plates was 250 μm.

(Example 1)

The second magnetic particles were mixed in a ratio of 15% by mass. When a magnetic field of 0.3 tesla (T) was applied, a shear stress at a shear rate of 100 s$^{-1}$ was 11.2 kPa.

(Example 2)

The second magnetic particles were mixed in a ratio of 25% by mass. When the magnetic field of 0.3 T was applied, the shear stress at the shear rate of 100 s$^{-1}$ was 11.5 kPa. When the magnetic field was not applied, the shear stress at the shear rate of 100 s$^{-1}$ was 0.012 kPa.

(Example 3)

The second magnetic particles were mixed in a ratio of 35% by mass. When the magnetic field of 0.3 T was applied, the shear stress at the shear rate of 100 s$^{-1}$ was 10.8 kPa.

(Comparative Example 1)

The second magnetic particles were mixed in a ratio of 0% by mass, i.e., the MR fluid contained the first magnetic particles only. When the magnetic field of 0.3 T was applied, the shear stress at the shear rate of 100 s$^{-1}$ was 9.2 kPa. When the magnetic field was not applied, the shear stress at the shear rate of 100 s$^{-1}$ was 0.0095 kPa.

(Comparative Example 2)

The second magnetic particles were mixed in a ratio of 50% by mass. When the magnetic field of 0.3 T was applied, the shear stress at the shear rate of 100 s$^{-1}$ was 9.5 kPa. When the magnetic field was not applied, the shear stress at the shear rate of 100 s$^{-1}$ was 0.021 kPa.

(Comparative Example 3)

The second magnetic particles were mixed in a ratio of 75% by mass. When the magnetic field of 0.3 T was applied, the shear stress at the shear rate of 100 s$^{-1}$ was 6.2 kPa.

(Comparative Example 4)

The second magnetic particles were mixed in a ratio of 100% by mass, i.e., the MR fluid contained the second magnetic particles only. When the magnetic field of 0.3 T was applied, the shear stress at the shear rate of 100 s$^{-1}$ was 5.2 kPa. When the magnetic field was not applied, the shear stress at the shear rate of 100 s$^{-1}$ was 0.025 kPa.

(Comparative Example 5)

Carbonyl iron particles having an average particle diameter of 1 μm (S-3700 manufactured by ISP Tech) were used as the second magnetic particles, and the second magnetic particles were mixed in a ratio of 25% by mass. When the magnetic field of 0.3 T was applied, the shear stress at the shear rate of 100 s$^{-1}$ was 9.4 kPa.

TABLE 1

| | Examples | | | Comparative Examples | | | | |
|---|---|---|---|---|---|---|---|---|
| | 1 | 2 | 3 | 1 | 2 | 3 | 4 | 5 |
| 1$^{st}$ magnetic particles (% by mass) | 85 | 75 | 65 | 100 | 50 | 25 | 0 | 75 |
| 2$^{nd}$ magnetic particles (% by mass) | 15 | 25 | 35 | 0 | 50 | 75 | 100 | 25 (1 μm) |
| Shear stress 0 T (kPa) | — | 0.012 | — | 0.0095 | 0.021 | — | 0.025 | — |
| Shear stress 0.3 T (kPa) | 11.2 | 11.5 | 10.8 | 9.2 | 9.5 | 6.2 | 5.2 | 9.4 |

Figure 4:
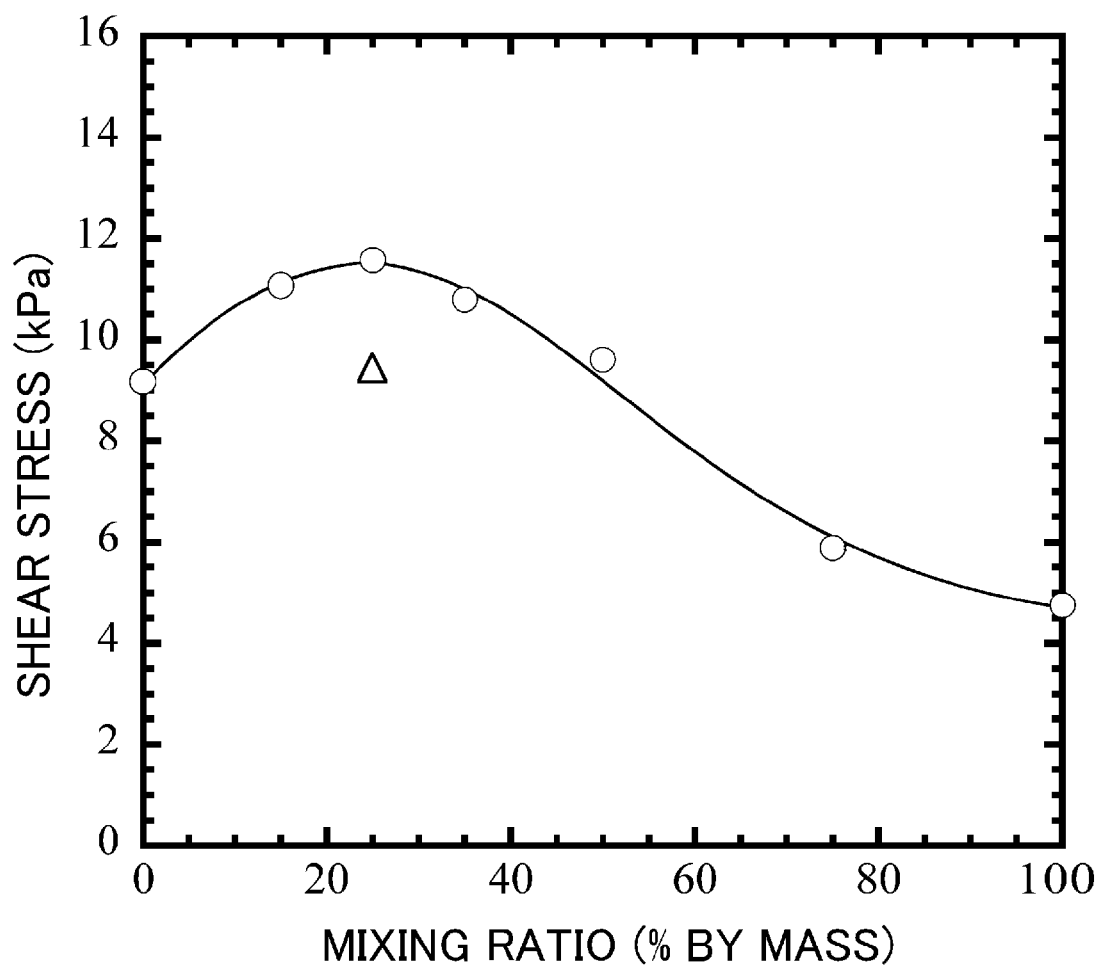
FIG. 4 is a graph illustrating a relationship between a mixing ratio of the second magnetic particles and a shear stress when a magnetic field is applied.

Table 1 shows the results of Examples and Comparative Examples. FIG. 4 shows a relationship between the mixing ratio of the second magnetic particles and the shear stress when the magnetic field of 0.3 T was applied. When the second magnetic particles having the average particle diameter of 0.1 μm were mixed in the ratio of 10% by mass-40% by mass, the shear stress exceeded 10 kPa. Thus, the shear stress was increased as compared with the MR fluid of Comparative Example 1 in which the second magnetic particles were not mixed. In the MR fluid of Comparative Example 5 containing the second magnetic particles having a large particle diameter, and the average particle diameter of the first magnetic particles was 10 or less times larger than the average particle diameter of the second magnetic particles, the shear stress was not improved even when the second magnetic particles were mixed in a ratio of 25% by mass as indicated by a symbol Δ in FIG. 4.

Figure 5:
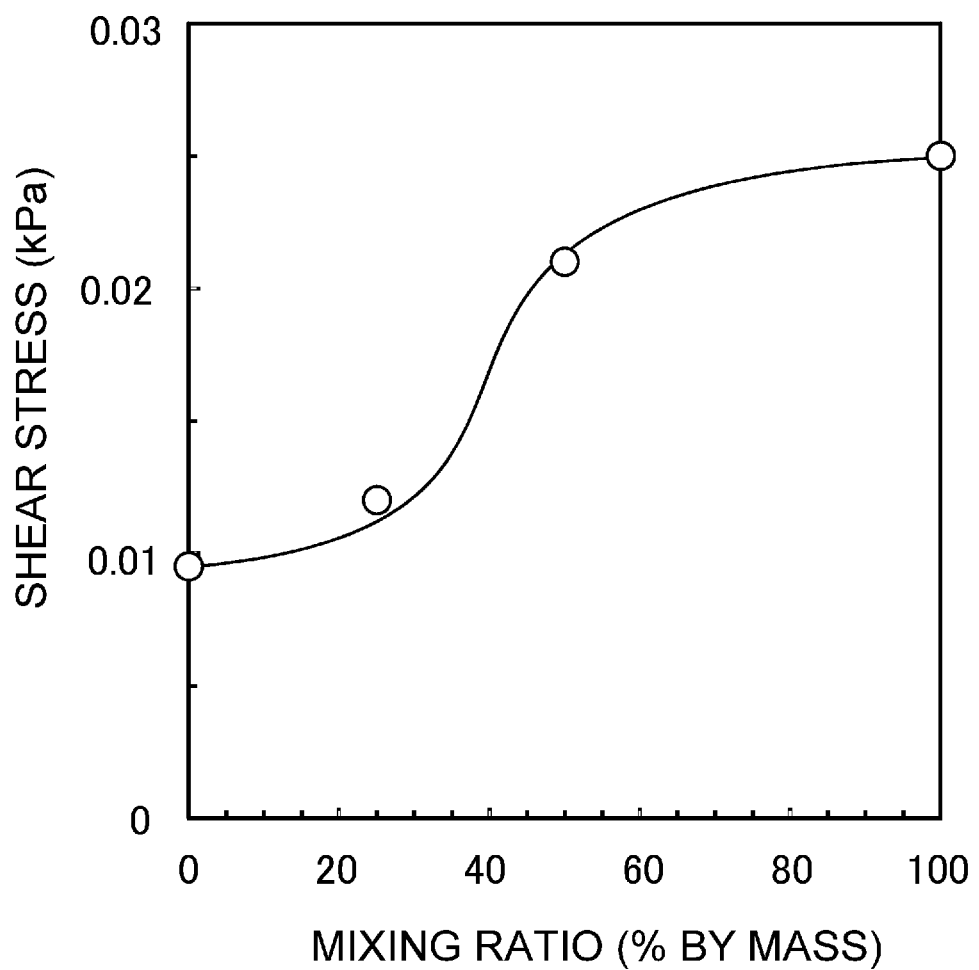
FIG. 5 is a graph illustrating a relationship between the mixing ratio of the second magnetic particles and the shear stress when the magnetic field is not applied.

FIG. 5 shows a relationship between the mixing ratio of the second magnetic particles and the shear stress when the magnetic field was not applied. The MR fluid of Example 2 in which the second magnetic particles were mixed in a ratio of 25% by mass showed the shear stress approximately the same as the shear stress of the MR fluid of Comparative Example 1 in which the second magnetic particles were not mixed. This indicates that the increase in normal viscosity was reduced. The MR fluid of Comparative Example 2 in which the second magnetic particles were mixed in a ratio of 50% by mass showed the shear stress 2 or more times higher than the shear stress of the MR fluid in which the second magnetic particles were not mixed. Thus, when the second magnetic particles were mixed in a ratio of 40% by mass or less, the shear stress in the absence of the magnetic field was small, and the increase in normal viscosity was reduced.

The disclosed magneto-rheological fluid is useful because the magneto-rheological fluid sensitively increases the stress when the magnetic field is applied.

What is claimed is:

1. A magneto-rheological fluid comprising:
   a magnetic particle mixture; and
   a dispersion medium for dispersing the magnetic particle mixture, wherein
   the magnetic particle mixture contains first magnetic particles and second magnetic particles,
   the first magnetic particles have an average particle diameter of 1 μm or more and 30 μm or less,
   the second magnetic particles are particles of a soft magnetic material, and have an average particle diameter of 50 nm or more and 200 nm or less, and
   a ratio of the second magnetic particles in the magnetic particle mixture is 10% by mass or more and 40% by mass or less.

2. The magneto-rheological fluid of claim 1, wherein the second magnetic particles are magnetite particles, or iron particles formed by an arc plasma method.

3. The magneto-rheological fluid of claim 1, wherein the average particle diameter of the first magnetic particles is 20 times or more the average particle diameter of the second magnetic particles, and is 500 times or less the average particle diameter of the second magnetic particles.

4. The magneto-rheological fluid of claim 1, wherein the first magnetic particles are carbonyl iron particles.

5. The magneto-rheological fluid of claim 1, wherein a surface modification layer is formed on a surface of each of the second magnetic particles.

6. The magneto-rheological fluid of claim 5, wherein the surface modification layer is made of a compound having a hydrocarbon chain bonded to the surface of each of the second magnetic particles.

7. A clutch comprising:
   a first member and a second member which are relatively rotatable;
   a magneto-rheological fluid filling a space between the first member and the second member; and
   a magnetic field generator for applying a magnetic field to the magneto-rheological fluid, wherein
   the magneto-rheological fluid is the magneto-rheological fluid of claim 1.

* * * * *